United States Patent
Kim

(10) Patent No.: US 6,909,616 B2
(45) Date of Patent: Jun. 21, 2005

(54) POWER SUPPLY AND POWER SUPPLY CONTROL DEVICE FOR AN ELECTRONIC EQUIPMENT HAVING A KEY OFF FUNCTION

(75) Inventor: Jung-hwan Kim, Gyunggi-do (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 101 days.

(21) Appl. No.: 10/649,727

(22) Filed: Aug. 28, 2003

(65) Prior Publication Data

US 2004/0052093 A1 Mar. 18, 2004

(30) Foreign Application Priority Data

Sep. 18, 2002 (KR) .................. 10-2002-0056707

(51) Int. Cl.$^7$ ........................................... H02M 3/335
(52) U.S. Cl. ..................................... 363/16; 363/21.15
(58) Field of Search ........................... 363/16, 20, 21.1, 363/21.7, 21.15, 97, 57, 98; 399/88.9, 86; 347/50, 16.2; 358/443, 444

(56) References Cited

U.S. PATENT DOCUMENTS

| | | | | |
|---|---|---|---|---|
| 4,928,220 A | * | 5/1990 | White | 363/21.1 |
| 4,937,728 A | * | 6/1990 | Leonardi | 363/97 |
| 5,313,381 A | * | 5/1994 | Balakrishnan | 363/147 |
| 5,617,016 A | * | 4/1997 | Borghi et al. | 323/284 |
| 5,852,550 A | * | 12/1998 | Majid et al. | 363/21.05 |

* cited by examiner

Primary Examiner—Rajnikant B. Patel
(74) Attorney, Agent, or Firm—Staas & Halsey LLP

(57) ABSTRACT

A power supply and power supply control device for an electronic equipment having a key-off function. A switching mode power supply is controlled by a key-off part and a power supply control part. A power key outputs a key-off signal in response to a manipulation of a user. The power supply is controlled by controlling an output of a pulse width modulator of the switching mode power supply. The key-off part outputs a power-off signal to stop an operation of the pulse width modulator in response to detecting that the key-off signal is output for a predetermined time. The power supply control part outputs a signal to start the operation of the pulse width modulator in response to an externally supplied power-on signal or an on state of a power switch. Holding the power switch in the on state for greater than the predetermined time generates an equivalent key-off signal.

10 Claims, 3 Drawing Sheets

POWER SUPPLY AND POWER SUPPLY CONTROL DEVICE FOR AN ELECTRONIC EQUIPMENT HAVING A KEY OFF FUNCTION

CROSS-REFERENCE TO RELATED APPLICATIONS

This application claims the benefit of Korean Application No. 2002-56707, filed Sep. 18, 2002, in the Korean Intellectual Property Office, the disclosure of which is incorporated herein by reference.

BACKGROUND OF THE INVENTION

1. Field of the Invention

The present invention relates to a power supply control device for an electronic equipment, and more particularly, to a power supply control device for an electronic equipment having a key-off function that controls a voltage to be supplied to the electronic equipment.

2. Description of the Related Art

A printer is a machine that prints printing data received from a computer connected to the printer and data of the printer on recording paper using ink or toner and then outputs the data. Such a printer is used only when performing a printing operation with respect to the printing data. When the printer does not perform the printing operation in the power-on state, unnecessary power consumption occurs.

A conventional printer is continuously supplied with a predetermined amount of power even in a turned-off state. Accordingly, when printing work is not being performed, the printer is switched to a sleep mode in which the printer is supplied with a lower voltage than required for the printing work in order to decrease the power consumption. However, the power consumption still occurs even in the sleep mode.

In order to solve the above problem, two ways of turning on a primary power supply of a power supplier automatically have been proposed. One way is that a user turns on a power key, and the other way is that a printer system supplies a power-on signal to the power supplier. When a user turns off the power-key, the power supplier is actually turned-off by a power-off signal of the printer system.

However, if an error occurs in the printer system, the power-off signal may not be transmitted and thus, the power supplier is not turned-off even when a user wishes to turn the power supplier off using the power key. In such case, disconnecting an AC power cord from an AC power source is necessary to turn off the printer. Accordingly, there is an inconvenience in using the printer.

SUMMARY OF THE INVENTION

The present invention has been developed in order to solve the above problem in a conventional printer. Accordingly, an aspect of the present invention is to provide a power supply control device for directly controlling power of a power supplier of a printer when the printer malfunctions, thereby preventing a problem of turning off the printer in an event of the printer malfunction.

Additional aspects and/or advantages of the invention will be set forth in part in the description which follows and, in part, will be obvious from the description, or may be learned by practice of the invention.

The above and/or other aspects are achieved by providing a power supply for an electronic equipment having a key-off function, comprising a power key which outputs a power-off signal in response to a manipulation of a user, a first rectifying part which rectifies an alternating voltage supplied through a power supply cord and outputs a first DC voltage, a transformer having a first winding supplied with the first DC voltage, and a second winding magnetically coupled with the first winding, a first switching part which switches on/off a current supply to the first winding, a second rectifying part which rectifies a voltage induced in the second winding of the transformer and outputs a second DC voltage, a pulse width modulation part which controls the on/off state of the first switching part, a key-off part which stops an operation of the pulse width modulation part in response to detecting that the power key is pressed for a predetermined time, and a power supply control part which outputs a signal to control the pulse width modulation part to switch on/off the first switching part in response to one of an externally supplied power-on signal and an on/off operation of a switch, the pulse width modulation part being controlled to switch off the first switching part in response to the key-off part detecting that the power key is pressed for a predetermined time.

The key-off part may comprise a comparator which compares a voltage which varies in response to a selection of the power key with an input reference voltage to output a key-off signal, and an OR gate which outputs a signal to switch off the first switching part in response to an externally supplied power-off signal or the key-off signal.

The power supply may further comprise a second switching part which outputs a power-on/off signal in response to an input signal from a host computer through a USB interface part and/or a power-off signal resulting from manipulation of the power key by a user, a third switching part connected at one end with a power supply terminal of the USB interface part, the power supply terminal providing a drive voltage for the third switching part, the third switching part being turned on by a trigger signal of the power switch, and a photo-coupler having a first light emitting element which is connected to a second end of the third switching part to emit light in response to the third switching part being turned on, and a photo-transistor which supplies a signal corresponding to the pulse width modulation part in response to the light emission of the first light emitting element.

The power supply may further comprise a second light emitting element serially connected with the phototransistor and which supplies a signal corresponding to the light emission of the first light emitting element to the pulse width modulation part, the second light emitting element serially connected to the alternating voltage supplied by the power cord, and a power sensing part which senses an on/off state of the power switch in response to light emitted by the second light emitting element.

The power supply may further comprise an auxiliary power supply which supplies the drive voltage for the third switching part when the drive voltage is not being supplied from the power supply terminal of the USB.

BRIEF DESCRIPTION OF THE DRAWINGS

The above aspects and/or advantages of the present invention will be more apparent by describing a preferred embodiment of the present invention with reference to the accompanying drawings, in which.

DETAILED DESCRIPTION OF THE PREFERRED EMBODIMENTS

Figure 1:
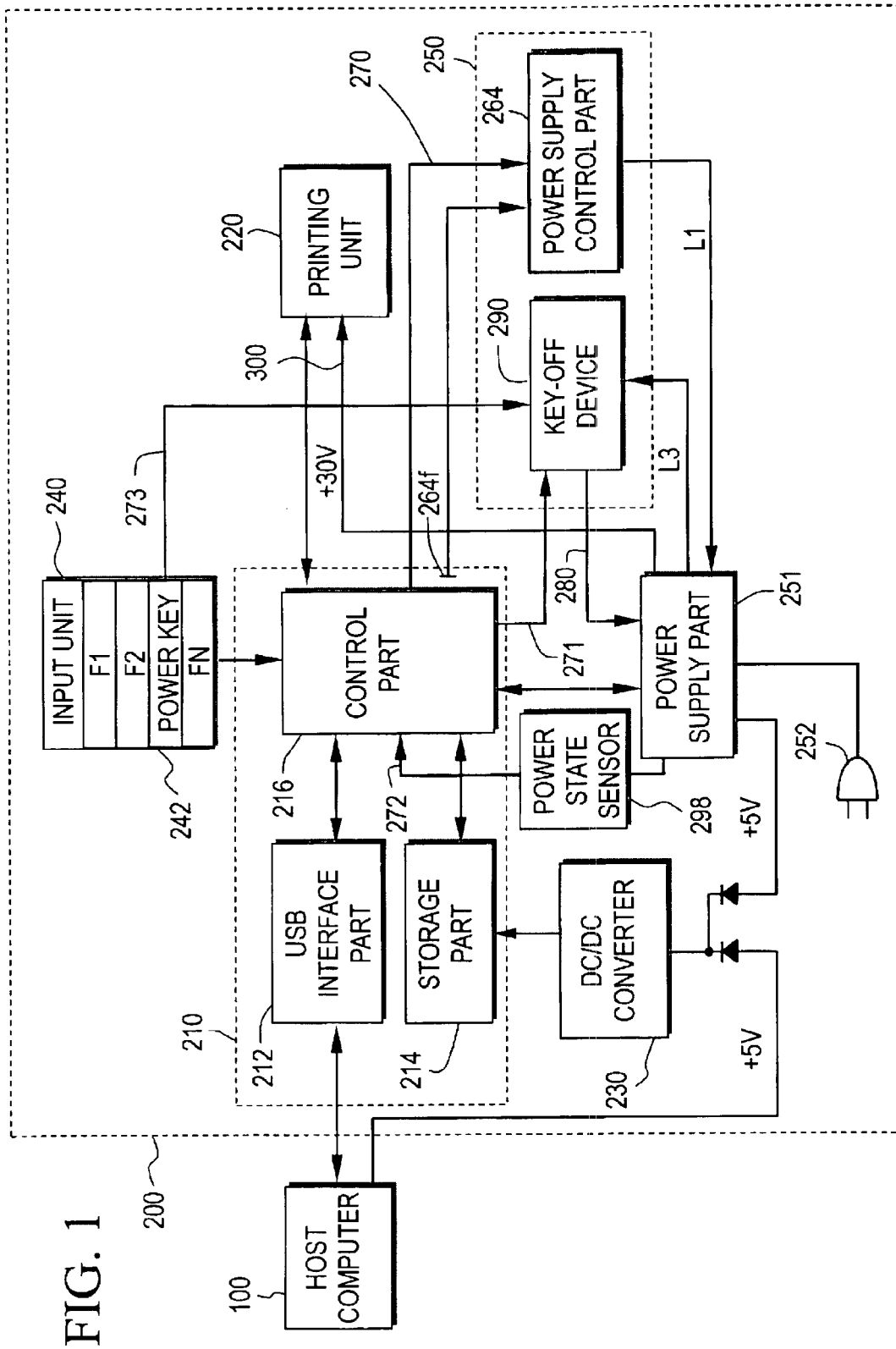
FIG. 1 is a block diagram showing a printer system having a power supply and a power supply control device for an electronic equipment having a key-off function according to an embodiment of the present invention.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

FIG. 1 is a block diagram showing a printer system employing a power supply control device for an electronic equipment having a key-off function according to an embodiment of the present invention.

As shown in FIG. 1, a printer system comprises a host computer 100 and a printer 200. The host computer 100 transmits signals, such as printing data and a printing command, to the printer 200, for controlling the printer 200, and also transmits a predetermined voltage for driving a signal-processing unit 210 of the printer 200. The printer 200 performs a printing operation with respect to the printing data, corresponding to the printing command provided by the host computer 100.

The printer 200 comprises the signal-processing unit 210, a printing unit 220, a DC/DC converter 230, an input unit 240, a power supply part 251 and a power supply control device 250.

The signal-processing unit 210 comprises an USB interface part 212, a storage part 214, and a control part 216 and controls the operation of the printer 200. A driving voltage necessary for the operation of the signal-processing unit 210 is approximately +2.5 V to +3.3V.

The USB interface part 212 is connected between the control part 216 and the host computer 100, and is generally connected to a parallel port of the host computer 100.

The USB interface part 212 receives signals corresponding to various control commands such as printing data, a printing command with respect to the printing data, and a power-on/off signal for the printer 200 from the host computer 100 through a data wire.

The storage part 214 stores the printing data and various programs necessary to perform the operation of the printer 200. The storage part 214 comprises a ROM for storing various control programs necessary to perform a function of the printer 200 and a RAM for temporarily storing various data.

The DC/DC converter 230 converts a predetermined voltage (+5V) supplied from the host computer 100 or a power supply part 251 to a voltage (+2.5V or +3.3V) and supplies the converted voltage to the signal-processing unit 210.

Accordingly, even when the printer 200 is not supplied with power, the signal-processing unit 210 may be driven with power that is supplied through a power supply line connected to the host computer 100.

The printing unit 220 performs the printing operation with respect to the printing data that are received through the USB interface part 212 under control of the control part 216.

The printing unit 220 includes a print head (not shown) which performs the printing, a head convey motor (not shown) for conveying the print head, and a print head driver (not shown).

The input unit 240 comprises a plurality of function keys F1, F2, ... FN which receive a selecting command from a user such as the printing command. The input unit 240 is disposed in a printer body for directly receiving the selecting command from the user.

Among the function keys (F1, F2, ... FN) is a power key 242. Using the power key 242, the user may control an off-state of the power supply part 251 of the printer system 200. That is, through touch, for example, by pressing the power key 242 for a predetermined time, the user can set the power-off state.

The power supply control device 250 controls the power that the power supply part 251 supplies to the printer 200 in response to a power-on/off signal received from the host computer 100 through the USB interface part 212, an operation of a power switch 264a, and an operation of the power key 242. The power switch 264a may be disposed on an exterior of the body of the printer 200 to allow the user to manipulate the power switch 264a.

Figure 4:
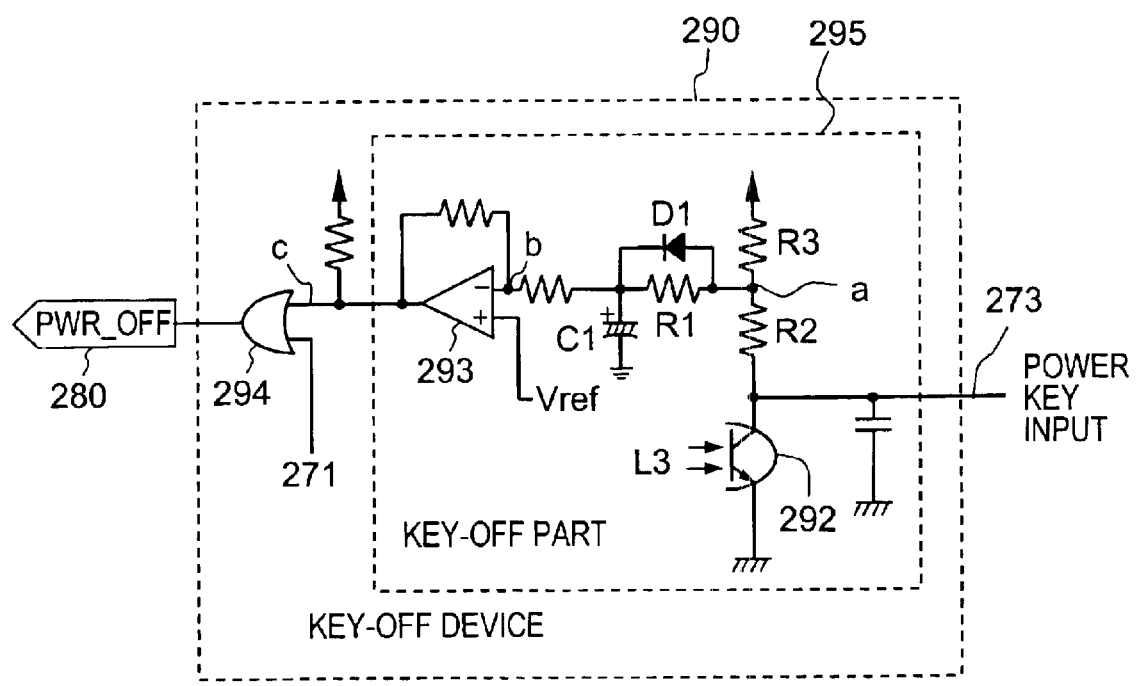
FIG. 4 is a schematic diagram showing the key-off device shown in FIG. 1.

The power supply control device 250 comprises a key-off device 290. Referring to FIG. 4, the key-off device 290 comprises an OR gate 294 and a key-off part 295 which detects whether the power key 242 is pressed. When the key-off part 295 detects that the power key 242 is pressed for a predetermined time, the key-off part 295 outputs a PWR_OFF signal 280 through the OR gate 294 to turn-off the power supply part 251.

The OR gate 294 outputs the PWR_OFF signal 280 to turn-off the power supply part 251 in response to one of a power-off signal 271 provided by the control part 216 and a KEY-OFF signal provided by the key-off part 295.

Figure 2:
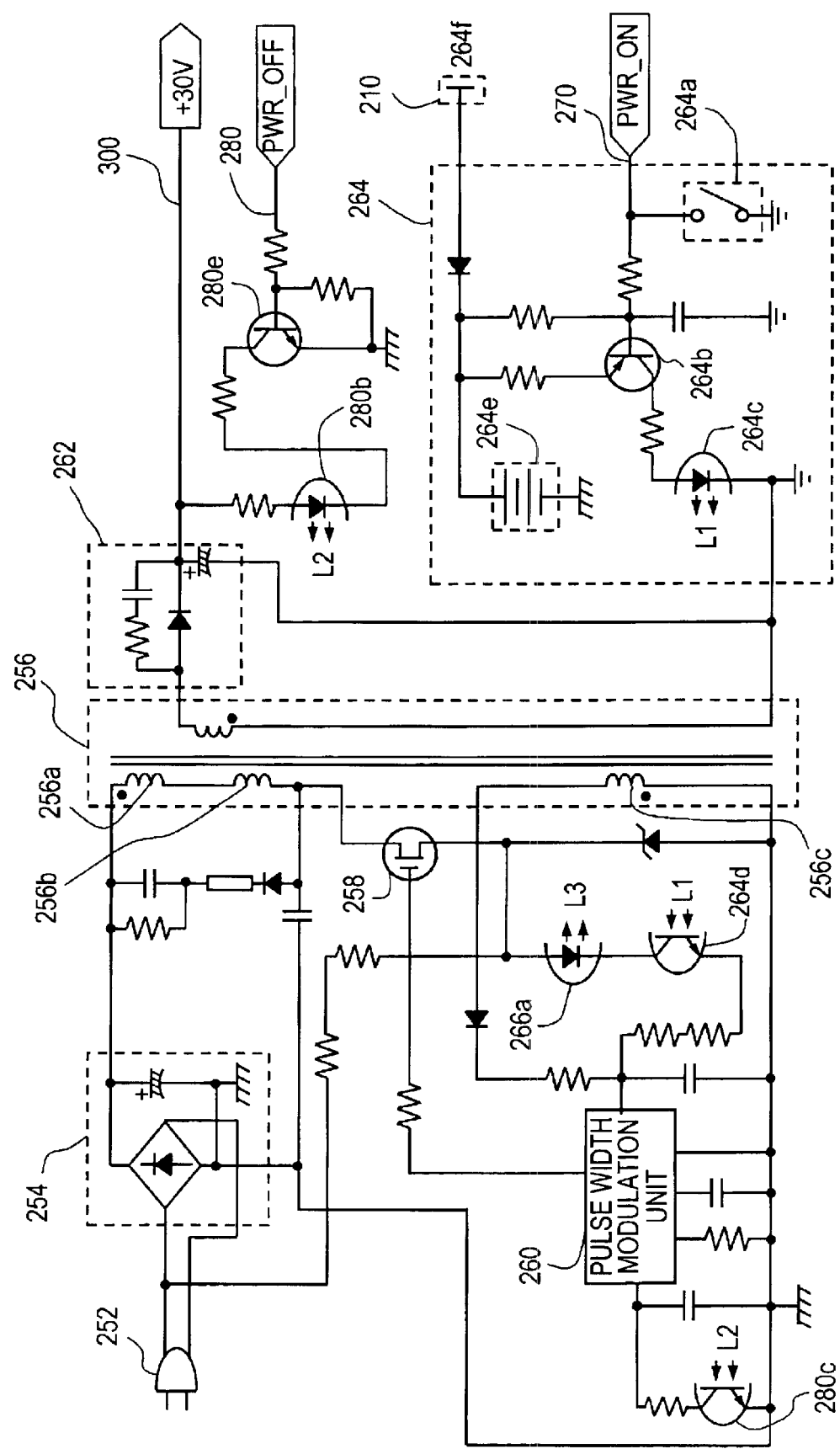
FIG. 2 is a detailed schematic diagram showing the power supply and the power supply control device shown in FIG. 1.
Figure 3:
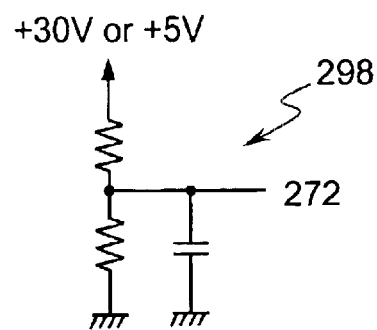
FIG. 3 is a schematic diagram showing a circuit for detecting a power supply state according to the present invention.

FIG. 2 is a schematic diagram for explaining operations of the power supply control device of FIG. 1 in conjunction with the power supply part 251 shown in FIG. 1. FIG. 3 is a schematic diagram of a power state sensor 298 for detecting a power supply state according to the present invention, and FIG. 4 is a schematic diagram of the key-off device 290 shown in FIG. 1.

As shown in FIG. 2, the power supply part 251 is a switching mode power supply (SMPS) comprising a first rectifying part 254, a first switching part 258, a transformer 256, a pulse width modulation unit 260, and a second rectifying part 262. A power supply control part 264 is also shown in FIG. 2.

The first rectifying part 254 rectifies an alternating voltage input through a power supply cord 252 and outputs a first DC voltage. The transformer 256 comprises a primary winding 256a one end of which is supplied with the first DC voltage and secondary windings 256b, 256c and 256d coupled with the primary winding 256a. A number of the secondary windings may be changed depending on a number of power sources of different levels required by the corresponding equipment.

The second rectifying part 262 rectifies a voltage supplied to the secondary winding, 256d.

The power supply-control part 264 outputs a signal to control the pulse width modulation unit 260 so that the pulse width modulation unit 260 switches on/off the first switching part 258 in response to the power-on signal 270 being supplied.

The power supply control part 264 further comprises a power switch 264a, a second switching part 264b, a light emitting element 264c, and an auxiliary power supply 264e. The power switch 264a outputs a power-on signal or a power-off signal in response to a manipulation of a user. Whether the output of the power switch is effectively a power-on signal or a power-off signal depends on a duration of closure of the switch 264a, as will be explained more fully below.

The second switching part 264b has one end connected to a power terminal 264f of the signal-processing unit 210 connected with the host computer 100. The second switching part 264b is switched on by turning-on the power switch 264a.

Power for the second switching part 264b is provided by one of a voltage supplied from the auxiliary power supply 264e and a voltage supplied by the power terminal 264f of the signal processing unit 210.

A light emitting element 264c has one end connected to the second switching part 264b and emits light L1 in response to the turning-on of the second switching part 264b. The light emitting element 264c optically communicates the light L1 to a photo-transistor 264d which supplies a signal to the pulse width modulation unit 260 in response to the light L1.

The pulse width modulation unit 260 controls the first switching element 258 to be switched on/off according to a predetermined duty ratio of the first switching part 258 according to whether the photo-transistor 264d is turned-on. The light emitting element 264c and the photo-transistor 264d form a photo-coupler. After the switching of the first switching element 258 begins, a voltage becomes available at the secondary winding 256c, which is rectified to provide a sustaining voltage for the pulse width modulation unit 260.

That is, second switching part 264b is turned-on by the power-on signal (low signal) 270 output from the control unit 216 corresponding to a power-on signal input from the computer 100 or by a manipulation of the power switch 264a by the user.

The light emitting element 264c emits the light when the second switching part 264b is turned-on. The emitted light causes the photo-transistor 264d to be turned-on and thus the pulse width modulation unit 260 operates to generate a predetermined voltage at the secondary winding 256d.

When a high level signal corresponding to the power-off signal 280 output from the key-off device 290 is input, a third switching part 280e is turned-on supplying power to light emitting diode 280b. By turning-on the third switching part 280e, a light emitting element 280b emits light L2. The emitted light L2 causes a photo-transistor 280c to be turned-on, supplying a low potential to a control terminal of the pulse width modulation unit 260, to turn off the pulse width modulation unit 260, turning off the first switching part 258, thus stopping a supply of power to the secondary winding 256d.

Accordingly, when a signal corresponding to the power-off signal 280 is input, the third switching part 280e is turned-on, the first switching part 258 is turned-off regardless of a voltage and a work load at an output terminal 300 and thus the supply of power to the output terminal 300 is blocked.

As shown in FIG. 4, the key-off device 290 comprises the OR gate 294 and the key-off part 295 and controls the power supply part 251 using the power key 242.

The key-off part 295 outputs a key-off signal (c) according to whether the power key 242 is pressed. The key-off part 295 comprises a capacitor C1, a diode D1, a photo-transistor 292, and a comparator 293. The photo transistor 292, when activated by a light L3 provides an input signal equivalent to pressing the power key 242 and a function thereof will be discussed below.

A power key confirmation signal 273 of the control input unit 240 for confirming whether the power key 242 is pressed is input to the key-off part 295. The key-off part 295 is connected to the power key 242 to directly receive a signal of the power key 242.

The comparator 293 has an inverting input and a non-inverting input into which a voltage of the capacitor C1 and a reference voltage Vref are respectively input.

The OR gate 294 receives the power-off signal 271 for controlling the power supply of the power supply part 251 of the printer system and the key-off signal (c) for controlling the power supply part 251. When either the power-off signal or the key-off signal is input at a high level, the high level signal is output to the power-off terminal 280 to thus turn-on the third switching part 280e. Accordingly, the first switching part 258 is turned-off regardless of the voltage and the work load of the output terminal 300 to thus block the voltage supply to the output terminal 300.

In the power-on state of the printer system, points 'a' and 'b' shown in FIG. 4 maintain the high level signal and a point 'c' maintains a low level signal.

When the power key 242 is pressed to forcedly block the power supply in the mal-operation of the printer, the power key confirmation signal 273 is changed from the high level to the low level and thus the point 'a' is changed from the high level to the low level. The capacitor C1 performs an electric discharge determined by resistances R1, R2 and R3. At this time, if a user presses the power key 242 only for a short time and then stops pressing, the capacitor C1 performing the electric discharge then performs a recharging through the resistor R3 and the diode D1, thereby preventing the output (c) of the comparator 293 from changing from the low level to the high level.

However, if the power key 242 is pressed for a longer time, the capacitor C1 continues the electric discharge and thus the voltage of the inversion terminal of the comparator 293 becomes lower than the reference voltage. Accordingly, the comparator 293 outputs a high level signal at the output (c) and the power-off signal 280 is output at the high level. As a result, the high level signal is input to the third switching part 280e (FIG. 2) and the third switching part 280e is turned-on, turning off the first switching part 258 via communication of the light L2 from the light emitting element 280b to the photo-transistor 280c, regardless of the voltage and the work load of the output terminal 300. Accordingly, the voltage supply is substantially blocked.

When the photo transistor 264d is turned on in response to the light L1, the light emitting device 266a emits a light L3. The light L3 is communicated to the photo transistor 292 which is shown in FIG. 4. In response to the communicated light L3, the photo transistor 292 turns on, providing a signal equivalent to the power key input signal 273. Thus, if the power on signal 270 or a closure of the switch 264a is provided for a predetermined time, i.e., less than a time to discharge the capacitor C1 below the Vref value, the pulse width modulation unit 260 is turned on to switch the first switching part 258. If the power on signal or a closure of the switch 264a is provided for greater than the predetermined time, the pulse width modulation unit 260 is turned off via communication of the light L2, thus stopping the switching of the first switching part 258 and terminating output of power to the printer via the terminal 300.

Operation of the printer system 200 employing the power supply control device having the key-off function according to the above described embodiment will be described.

When the control part 216 is turned-on by a voltage supplied to drive the signal-processing unit 210, the control part 216 controls the general operations of the printer 200 according to a program stored in the storage part 214.

The control part 216 confirms the output voltage of the output terminal 300 to determine the power status of the printer 200. When the control part 216 confirms the output signal of the output terminal 300 of the power supply control device 250 is a high level signal, the control part 216 determines that the printer 200 is in the on-status. When the control part 216 confirms the output signal is a low level signal, the control part determines that the printer 200 is in the off-status.

The voltage output of the output terminal 300 may be confirmed by sensing a power sensing signal 272 that is obtained by dividing the output voltage using the power state sensor 298 as shown in FIG. 3 or by sensing a contemporaneously output voltage from another of the secondary windings of the transformer 256.

If the printer 200 is in the off-status, the control part 216 switches the printer 200 to a sleep mode in which the printer is deactivated until a signal and printing data corresponding to the power-on signal are transmitted.

When the printer 200 is in the sleep mode and receives the power-on signal corresponding to a manipulation of the power switch 264a or receives the printing data from the host computer 100, the control part 216 outputs a control signal to the power supply control device 250 to operate the printing unit 220.

When the printer 200 is in the off-state or the sleep status and the control part 216 receives the power on signal from the host computer 100 through the USB interface part 212, the control part 216 outputs the power on signal 270 to the power supply control device 250, thereby instructing the power supply part 251 to supply a voltage necessary for the operations of the signal-processing unit 210 and the printing unit 220. When the printer 200 is in the off-state or the sleep state and the user operates the power switch 264a, the power supply control device 250 instructs the power supply part 251 to supply the voltage necessary for the operations of the signal processing unit 210 and the printing unit 220.

When the control part 216 receives the power-on signal resulting from manipulation of the power switch 264a or the host computer 100 through the USB interface 212, the control part 216 outputs a low level signal corresponding to the power-on signal to the power-on terminal 270 of the power supply control device 250.

When the control part 216 receives the power-off signal from the host computer 100 through the USB interface part 212 or from the power key 242 of the input unit 240, the key-off device 290 of the control part 250 outputs a high level signal at the power-off terminal 280 of the power supply control device 250.

If a connector of the USB interface part 212 is disconnected from the host computer 100, the control part 216 determines that the power is not supplied from the host computer 100 and outputs the control signal 271 to the power supply control device 250 to block the power supply from the output terminal 300. The control part 216 re-determines whether the power switch 264a is in the on-state or in the off-state using the received power sensing signal 272.

When the control part 216 determines through the power sensing signal 272 that the power switch 264a is in the off-state, the control part 216 controls the second switching part 264b not to be turned on even with reception of the information corresponding to the power on signal through the USB interface part 212.

Also, when the control part 216 determines by the key-off device 290 that the power key 242 is pressed, the control part 216 controls the second switching part 264b not to be turned-on even with the reception of the information corresponding to the power-on signal through the USB interface part 212.

As described above, the power supply control device 250 controls the power supply to the printer by manipulating the power switch 264a with the auxiliary power supply 264e even when a predetermined voltage to drive the signal processing unit 210 is not supplied from the host computer 100 through the USB interface 212.

Also, when the power key 242 is pressed to forcedly block the power supply during a malfunction of the printer, the power supply is blocked based on the signal of the power-off terminal 280 of the key-off device 290 regardless of the voltage and the work load at the output terminal 300.

Accordingly, the power supply control device of the electronic equipment according to the present invention conveniently controls the power supply to the printer by using the power key even with a malfunction of the printer.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A power supply for an electronic equipment, comprising:
   a power key which outputs a key-off signal in response to a manipulation of a user;
   a power switch;
   a first rectifying part which rectifies an alternating voltage and outputs a first DC voltage;
   a transformer having a first winding having a first end connected to the first DC voltage, and a second winding magnetically coupled with the first winding;
   a first switching part connected to a second end of the first winding and which switches on/off a current supply to the first winding;
   a second rectifying part which rectifies a voltage induced in the second winding and outputs a second DC voltage;
   a pulse width modulation part which controls an on/off state of the first switching part; and
   a power supply control device, comprising:
      a key-off device which:
         detects whether the key-off signal is output for a predetermined time, and
         outputs a power-off signal to control the pulse width modulation part to switch off the first switching part in response to detecting that the key off signal is output for the predetermined time, and
      a power supply control part which outputs a power-on signal to control the pulse width modulation part to switch on/off the first switching part in response to one of an externally supplied power-on signal and an on/off operation of the power switch.

2. The power supply of claim 1, wherein the key-off device comprises:
   a comparator which compares the key-off signal with an input reference voltage and outputs a high level signal if the key-off signal is less than the input reference voltage for the predetermined period of time; and
   an OR gate which outputs the power-off signal in response to the high level signal at a first input of the OR gate or in response to an externally supplied power-off signal at a second input of the OR gate.

3. The power supply of claim 1, wherein:
   the externally supplied power-on signal is provided from a host computer through a USB interface part;
   the power supply control device further comprises:
      a second switching part which switches power from a power supply terminal of the USB interface part in response to the one of the externally supplied power-on signal and the on/off operation of the power switch, and
      a first light emitting element which emits light in response to the power switched by the second switching part; and
   the power supply further comprises a photo-transistor which turns on to supply a signal to the pulse width modulation part to control the pulse width modulation part to switch on/off the first switching part in response to the light emitted by the first light emitting element.

4. The power supply of claim 3, further comprising:
   a second light emitting element serially connected with the photo-transistor and the alternating voltage input to the first rectifying part, and which emits light in response to the photo-transistor being turned on; and
   the power key device further comprises a power sensing part disposed to the emitted light of the second light emitting element, for sensing the on/off state of the power switch.

5. The power supply of claim 3, further comprising:
   an auxiliary power supply, disposed on a voltage supply path from the power supply terminal of the USB interface part to the second switching part, which supplies a voltage to the second switching part.

6. A control device for an electronic equipment having a power key, which outputs a key-off signal in response to a manipulation of a user, a USB interface which communicates with a host computer, and a switching mode power supply (SMPS), the control device comprising:
   a power switch;
   a key-off device which outputs a power-off signal to turn off the SMPS in response to detecting that the key-off signal is provided for a predetermined time; and
   a power supply control part which outputs a power-on signal to turn on the SMPS in response to either one of a power on signal supplied by the host computer through the USB interface and an operation of the power switch.

7. The control device of claim 6, wherein the key-off device comprises:
   a comparator having first input connected to a voltage reference and a second input; and
   an RC network which controls an application of the key-off signal to the second input of the comparator in accordance with a time constant determined by the RC network to delay the power-off signal until the key-off signal has been applied for the predetermined time.

8. The control device of claim 7, wherein:
   the SMPS comprises:
      a first photo-transistor which conducts in response to first emitted light, to turn off the SMPS,
      a second photo-transistor which conducts in response to second emitted light, to turn on the SMPS, and
      a first light emitter which emits the first emitted light in response to the delayed power-off signal; and
   the power supply control part comprises a second light emitter which outputs the power-on signal as the second emitted light.

9. The control device of claim 7, wherein:
   the SMPS comprises:
      a first photo-transistor which conducts in response to first emitted light, to turn off the SMPS,
      a second photo-transistor which conducts in response to second emitted light, to turn on the SMPS,
      a first light emitter which emits third emitted light in response to the conduction of the second photo-transistor, and
      a second light emitter which emits the first emitted light in response to the delayed power-off signal;
   the power supply control part comprises a third light emitter which outputs the power-on signal as the second emitted light; and
   the key-off device further comprises a third photo-transistor which generates a signal equivalent to the power-key signal;
   wherein:
      where the second emitted light is emitted for less than the predetermined time, the power supply turns on, and
      where the second emitted light is emitted for greater than or equal the predetermined time, the power supply turns off in response to the equivalent power-key signal.

10. A control system for a switching mode power supply (SMPS) for an electronic equipment, comprising:
   a power key, which outputs a key-off signal in response to a manipulation of a user,
   a power switch having an on state and an off state;
   a first photo-transistor which conducts in response to first emitted light, to turn off the SMPS,
   a second photo-transistor which conducts in response to second emitted light, to turn on the SMPS,
   a first light emitter which emits third emitted light in response to the conduction of the second photo-transistor;
   a second light emitter which emits the first emitted light in response to the key-off signal being output for at least a predetermined time;
   a third light emitter which outputs the second emitted light in response to the on state of the power switch; and
   a third photo-transistor which generates a signal equivalent to the key-off signal in response to the third emitted light, wherein:
   where the second emitted light is emitted for less than the predetermined time, the SMPS turns on, and where the second emitted light is emitted for at least the predetermined time, the SMPS turns off in response to the equivalent power-key signal.

* * * * *

UNITED STATES PATENT AND TRADEMARK OFFICE
CERTIFICATE OF CORRECTION

PATENT NO. : 6,909,616 B2
DATED : June 21, 2005
INVENTOR(S) : Jung-hwan Kim

It is certified that error appears in the above-identified patent and that said Letters Patent is hereby corrected as shown below:

<u>Column 8,</u>
Line 61, change "key off" to -- key-off --.

<u>Colum 9,</u>
Line 56, change "power on" to -- power-on --.

Signed and Sealed this

Fourteenth Day of March, 2006

JON W. DUDAS
*Director of the United States Patent and Trademark Office*